(12) United States Patent
Hou

(10) Patent No.: US 7,269,325 B2
(45) Date of Patent: Sep. 11, 2007

(54) TUNABLE OPTICAL DEVICE

(76) Inventor: Jidong Hou, Room 102, Building 179, Lane 1088, Xinnan Road, Songjiang District, Shanghai (CN) 201612

(*) Notice: Subject to any disclaimer, the term of this patent is extended or adjusted under 35 U.S.C. 154(b) by 0 days.

(21) Appl. No.: 10/976,812

(22) Filed: Nov. 1, 2004

(65) Prior Publication Data
US 2005/0094963 A1    May 5, 2005

Related U.S. Application Data

(60) Provisional application No. 60/517,021, filed on Nov. 3, 2003.

(51) Int. Cl.
*G02B 6/26* (2006.01)
*H01S 5/00* (2006.01)

(52) U.S. Cl. .................. 385/141; 385/140; 372/50

(58) Field of Classification Search ............... 385/131, 385/18
See application file for complete search history.

(56) References Cited

U.S. PATENT DOCUMENTS

| | | | |
|---|---|---|---|
| 5,589,689 A * | 12/1996 | Koskinen | 250/339.01 |
| 6,556,338 B2 * | 4/2003 | Han et al. | 359/298 |
| 6,567,448 B1 * | 5/2003 | Sun et al. | 372/50.1 |
| 6,768,097 B1 * | 7/2004 | Viktorovitch et al. | 250/226 |
| 2001/0028503 A1 * | 10/2001 | Flanders et al. | 359/578 |
| 2002/0168136 A1 * | 11/2002 | Atia et al. | 385/18 |
| 2003/0020926 A1 * | 1/2003 | Miron | 356/519 |
| 2005/0018331 A1 * | 1/2005 | Pautet et al. | 359/885 |

* cited by examiner

*Primary Examiner*—Frank G. Font
*Assistant Examiner*—Eric Wong

(57) ABSTRACT

The present innovation discloses the design, configuration and process of a kind of MEMS-based tunable optical devices. The devices can be classed as dual-cavity of Fabry-Perot resonators, which consist of a first outer membrane, a middle membrane and a second outer membrane. And these membranes are separated by cavities. The membranes will deflect under electrostatic force and the thicknesses of cavities will change. The numbers of the layers of membranes should satisfy an equation. These devices can be adopted for optical switches, VOA or tunable filters.

8 Claims, 8 Drawing Sheets

TUNABLE OPTICAL DEVICE

CROSS-REFERENCE TO RELATED APPLICATIONS

This Application claims a priority date of Nov. 3, 2003 benefited from a previously filed Provisional Patent Application 60/517,021 filed on Nov. 3, 2003 by the Applicants of this Formal Patent Application

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present innovation is related to the optical telecommunication, Particularly to the design and manufacture of tunable optical devices for WDM (Wavelength Division Multiplexed) systems. WDM technology highly expends the capability of modem optical communication network. Tens of wavelengths located between 1530 to 1570 mn can pass through a signal fiber by this technology. Each wavelength corresponds to a Channel. With the development of the optical telecommunication, the network becomes more and more complicated in structures. The network should be intelligent, meaning be more flexible and scalable. These characteristics strongly depend on tunable devices, such as optical switches, variable optical attenuators (VOA) and tunable filters.

Optical switches are used to selectively reroute signals or to control the traveling direction of light beams. VOA are used to adjust light intensities so the network could work in order. Tunable filters are used to select a certain wavelength among many wavelengths and the network can be dynamically managed.

These devices are basic in optical network, and they should have the characteristics such as small size, low power consumption, high reliability, high tuning speed and small insertion loss. Until now, switches, VOA and tunable filters can be made based on different principles, such as mechanical moving, magneto optical effect, electro optical effect, acoustic optical effect and thermal effect. For devices based on magneto optical effect, the power consumption is high. And due to the magnetic parts, they are hard to be made small. For devices based on electro optical effect, the applied voltage is usually quite high. For devices based on acoustic optical effect, side lobes are strong and insertion loss is large. For devices based on thermal effect, the tunable range is small and the response time is usually long.

As for the mechanical principle, it can be divided in several methods. Some devices adopt motors to drive optical parts, some adopt piezocrystal. All these methods need heavy labor on assembly. Recently, MEMS technology has been introduced into manufacturing optical devices. It adopts the state-of-the-art technology of semiconductor to batch fabricate small-sized devices.

For MEMS technology, reflection by micro-mirrors can be adopt to make VOA and switches, while the robust of micro-mirrors is poor; Diffraction by grating is only good for making VOA; Interference devices based on the Fabry-Perot cavity can have very narrow resonant frequency, and is okay to be used for monitoring channels. However, it is poor in re-routing channels. Every optical channel has bandwidth due to modulation, and some information of channels will be filtered out and the error rate will increase if we use the Fabry-Perot cavity as tunable filters to select channels. This shortcoming will become severe in DWDM. Interference devices based on the Fabry-Perot cavity have poor performance for VOA and switches since the wavelength dependent loss (WDL) is high.

Fabry-Perot resonators with multiple-cavity can have flat passband with high resolution. Tunable filters having this structure will be suitable for re-routing channels. When the reflectivity of the resonators is low, this structure can also be adopted for VOA and Switches. Since this structure requires substantially identity of cavities, Macro devices based on this structure is difficult to be made and lack mechanical stability. U.S. Pat. No. 6,424,466 give a related MEMS-based design of tunable filters, but it is mainly on the process of assembling.

BRIEF SUMMARY OF THE INVENTION

The present innovation discloses the structure and process of a kind of MEMS-based tunable optical devices. These devices can be adopted for optical switches, VOA or tunable filters. These tunable devices have some advantages. First, by using MEMS technology, the size of these tunable devices can be very small, and these devices can be batch fabricated. Second, the mechanical robustness is improved, for moving is achieved by deflection of membranes which have less mass. Third, the power consumption is almost neglectable, for these optical devices are driven by electrostatic force. Forth, no more optical coating is needed, and all optical functions are achieved by membranes themselves.

In the present innovation, the devices for optical switches, VOA and tunable filters have the same optical structures. They all can be classed as dual-cavity of Fabry-Perot resonators, which consist of a first outer membrane, a middle membrane and a second outer membrane. And these membranes are separated by a first cavity and second cavity, respectively. The membranes comprise alternatively layers of high refractive index materials and low refractive index materials. The two outer membranes have lower reflectivity than the middle one does. And the number of the total layers of each membrane is odd. To increase the reflectivity, the first layer of each membrane is high refractive index layer. Since the number of the total layer is odder, the last layer of each membrane is also high refractive index layer. Another advantage of odd layers is that the membranes are symmetric to the middle layers and the stresses are balanced. The first and second outer membrane can comprise at least one high refractive index layers. In the present innovation, the high refractive index material is polysilicon or amorphous silicon, and the low refractive material is silicon nitride. They are standard materials in semiconductor industry. The optical thickness of every layer is the odder multiplex time of a quarter of light wavelength, preferably 1 or 3 times of a quarter wavelength are chosen.

Let N1 denote the number of the layers of the first outer membrane, N2 denote the number of the layers of the second outer membrane and N3 denote the number of the layers of middle membrane. The present innovation discloses an equation of the relationship of these numbers: $N1+N2+5=N3$. When they satisfy the equation, the devices will have a flat passband with few ripples.

The present innovation also discloses the process of making such devices. The state-of-the-art semiconductor technology will insure the thicknesses of membranes and cavities, and no manual assembly is needed on chip level.

In the present innovation, membranes are deposited on substrates, and the substrate is preferably doped silicon. The membranes are electrical conductive and will deflect under electrostatic forces between membranes or between membranes and substrates, causing the change of the thicknesses of cavities. And optical properties of the devices will vary consequently.

The embodiments of the present invention can comprise one substrate or two substrates. All the materials for membranes and cavities are deposited on the substrates. The embodiments having two substrates are formed by bonding or gluing the two substrates.

The out membranes of the embodiment adopted for tunable filters have hat-top structure which will benefit the optical properties of device. The surfaces of the hat-top structures will become curved when the membranes are released.

The embodiment having one substrate can be used for switches and VOA, and the embodiment having two substrates can be used for switches, VOA and tunable filters.

More features and advantages of the present innovation will now be more particularly described with reference to the accompanying drawings and pointed out in the claims. It will be understood that the particular method and device embodying the present invention are shown by way of illustration and not as a limitation of the invention. The principles and features of this invention may be employed in various and numerous embodiments without departing from the scope of the present invention.

BRIEF DESCRIPTION OF THE SEVERAL VIEWS OF THE DRAWING

The accompanying drawings are not necessarily to scale; emphasis has instead been placed upon illustrating the principles of the invention. Of the drawings.

DETAILED DESCRIPTION OF THE INVENTION

Figure 1:
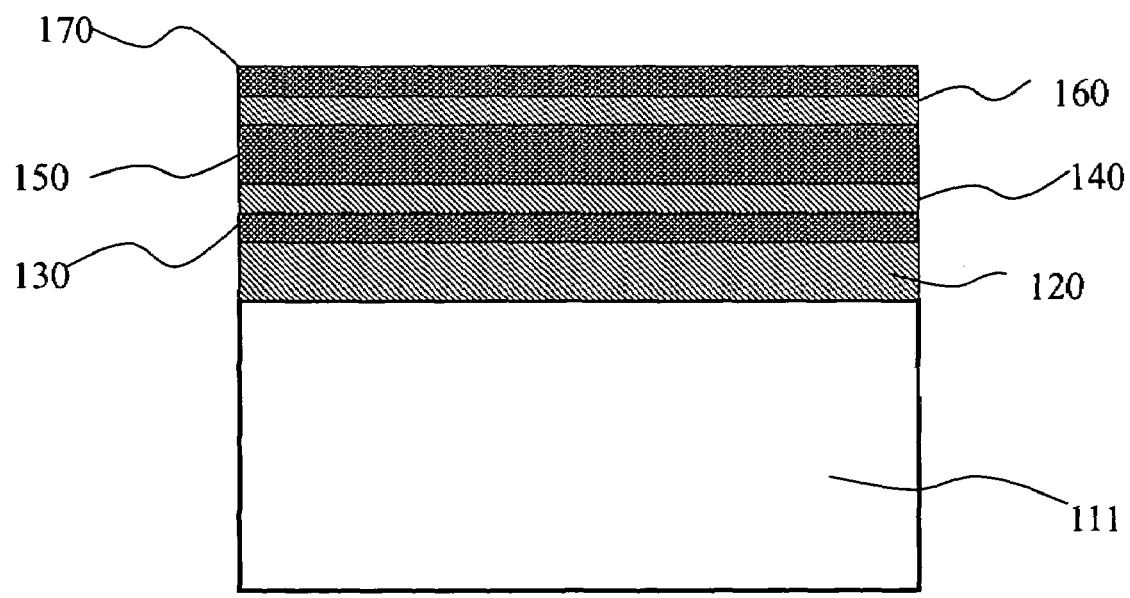
FIG. 1 illustrates the sequence of deposition of membranes and silicon dioxide layers on a substrate.

FIG. 1 is a schematic cross-sectional view illustrating the process for fabricating a device having one substrate according to the present invention. At first, a layer of silicon dioxide 120 is deposed on a substrate 111. This silicon dioxide can be LTO, PSG, BPSG or phosphor doped LTO. When it mentioned below, silicon dioxide in the present innovation means one of the following materials: LTO, PSG, BPSG and phosphorus doped LTO. Substrate 111 is electrically conductive. The thickness of silicon dioxide layer 120 is in the range of 2 to 5 micrometer. Then a first outer membrane 130 is deposited on the dioxide layer 120. A first outer membrane 130 is formed by alternatively deposition of the layers of high refractive index materials and low refractive index materials with LPCVD or PECVD. The optical thicknesses of these layers are the odder multiplex time of quarter of light wavelength. The high refractive index material is polysilicon or amorphous silicon, and the low refractive index material is nitride. A part of the dioxide layer 120 will be etched off to release the membrane 130, and the other parts support the membrane 130.

After the first outer membrane 130 is formed, a silicon dioxide layer 140 is deposited, followed by the alternative deposition of high and low refractive index materials to form a middle membrane 150. And on the middle membrane 150, a layer of silicon dioxide 160 is deposited. On the dioxide layer 160 a second outer membrane 170 is deposited.

The structures and deposition process of the first outer membrane 130, the middle membrane 150 and the second outer membrane 170 are the same, which are formed by alternative layers of polysilcon/amorphous silicon and nitride. And the optical thicknesses of these layers are the odder multiplex time of quarter of light wavelength. The first layer and the last layer of these membranes are polyisilicon or amorphous layers. The membrane 130,150 and 170 are multi-layer dielectric membranes. In the present innovation, said multi-layer dielectric membranes are composed by alternative layers of high refractive index material an low refractive index material. In the present innovation, the high refractive index material is polysilicon or amorphous silicon, and the low refractive material is nitride.

Generally, N1, the number of the total layers of the first outer membrane 130, and N2, the number of the total layers of the second outer membrane 170, are the same. And N3, the number of the total layers of the middle membrane 150, satisfies the equation: N1+N2+5=N3.

Figure 2:
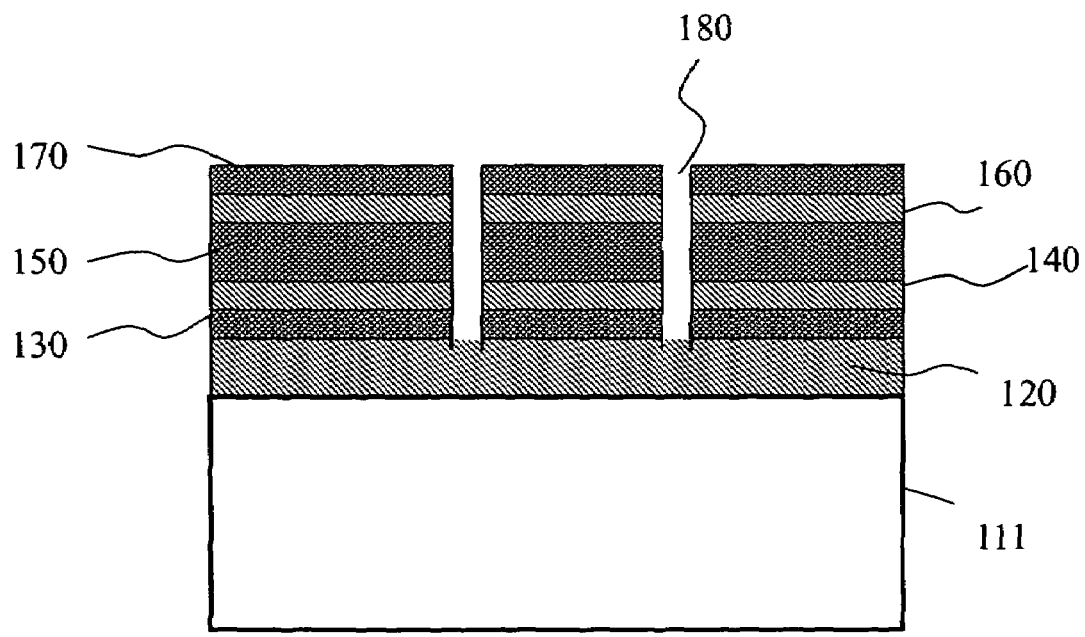
FIG. 2 illustrates some holes are etched through the membranes and dioxide layers around light path.

FIG. 2 illustrates, around light path of the device, some holes 180 are made through the membrane 170, dioxide layers 160, membrane 150, dioxide layer 140 and membrane 130. Photo resist can be used as mask and the holes 180 can be made by a dry etcher.

Figure 3:
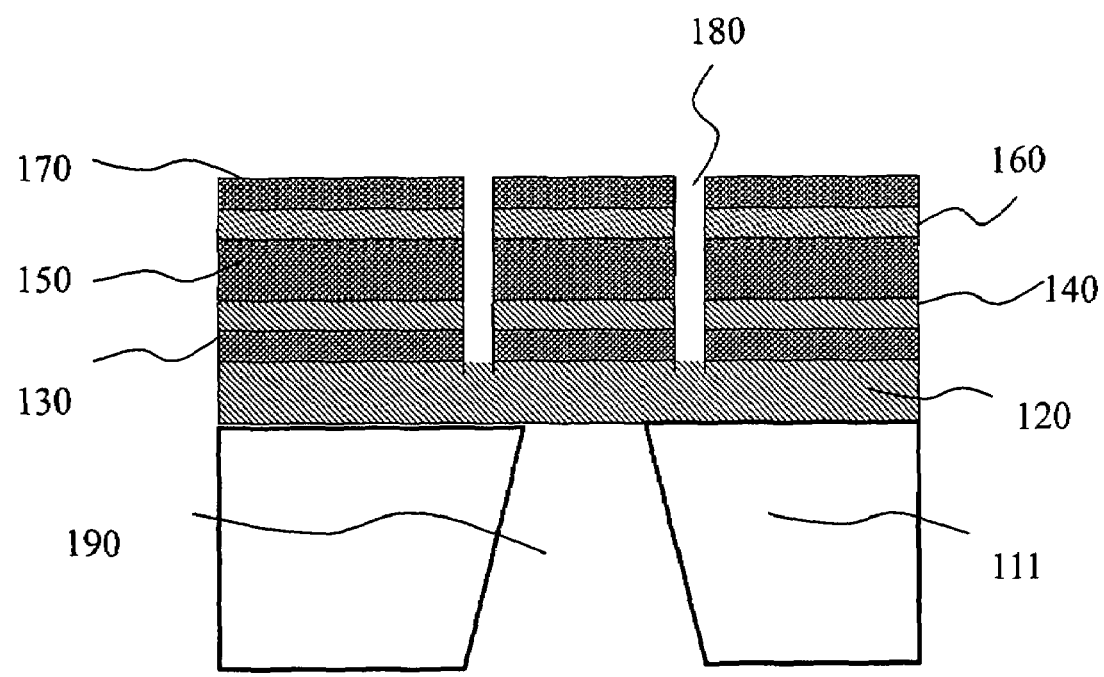
FIG. 3 illustrate a hole is etched through on a substrate.
Figure 4:
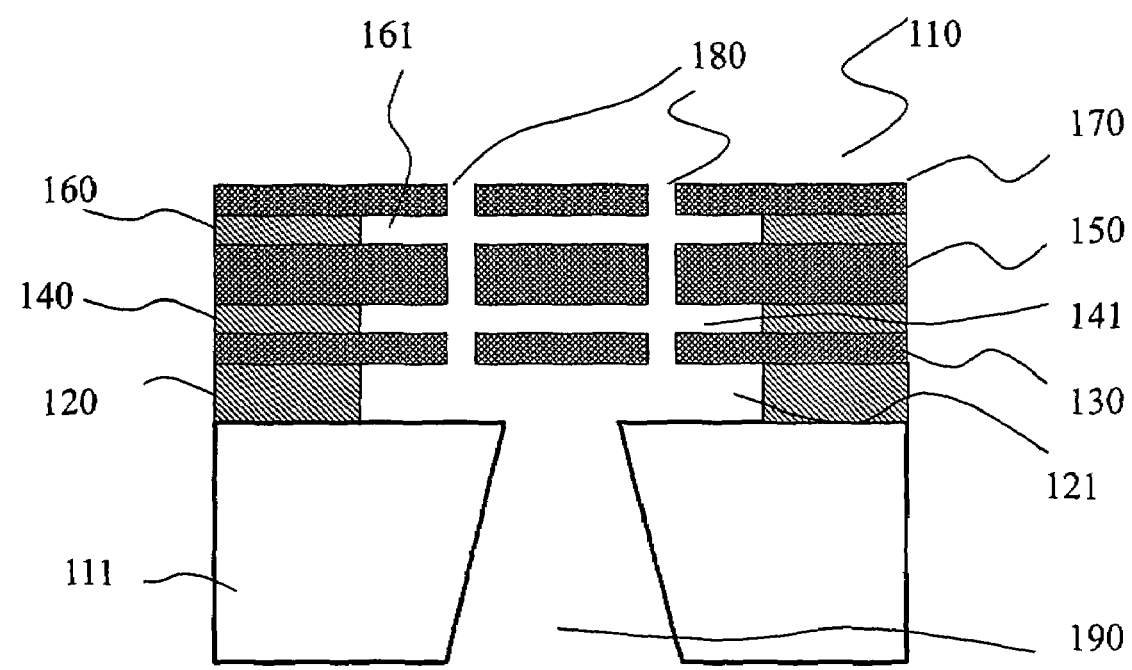
FIG. 4 illustrates the structure of a device having one substrate.

FIG. 3 shows a hole 190 is etched through on the substrate 111. Light beam can shine on outer membranes directly. Then the silicon dioxide layers on substrate 111 are etched by HF. After certain time, the devices are cleaned and fully dried. FIG. 4 illustrates the final structures of the device 110. Around the holes 180 and 190, a part of dioxide layer 120, 140 and 160 are etched off. And a non-optical cavity 121, a first optical cavity 141 and a second optical cavity 161 are formed.

The first layers or the last layers of the first outer membrane 130 and second outer membrane 170 are doped so they are electrically conductive. In the light path, doping is optional to decrease the absorption of light. In the regions corresponding to the peripheries of chip dies, the first and the last layer are not doped to decrease the possibility of current leakage. The middle membrane 150 can be doped or not.

The stresses of these membranes are tensile. This can be achieved by controlling the parameters of deposition of these membranes.

Two adjustable voltages are applied to generate electrostatic forces to vary the optical properties of the devices 110. In the case that the middle membrane 150 is not doped, there are two methods to apply voltages on the device 110.

One method is as following: an adjustable voltage is applied between the substrate 111 and the first outer membrane 130, another adjustable voltage is applied between the first outer membrane 130 and the second outer membrane 170. When the voltage between the first and second outer membrane increases, the first and second outer membrane will attract each others and the first cavity 141 and second cavity 161 will become thinner. The voltage between the substrate 111 and first outer membrane 130 is used to modify the thickness of the first cavity 141 to insure the thickness identity of both cavities. The middle membrane bears no electrostatic force and it does not move. This method makes the first cavity 141 and second cavity 161 thinner. The original thicknesses of the first cavity 141 and second cavity 161 can be one wavelength. When no voltages applied, the light incident will fully pass through the devices. When voltages increased, the first cavity 141 and second cavity 161 can become three quarter of wavelength, and the light incident is fully reflected. The original thicknesses of the first cavity 141 and second cavity 161 can also be three quarter of wavelength.

The other method is like this: an adjustable voltage is applied between the substrate 111 and the first outer membrane 130, another adjustable voltage is applied between the first outer membrane 130 and the second outer membrane 170. When these two voltage increase, due to the electrostatic force, the substrate 111 attracts first outer membrane 130, at mean time the first outer membrane 130 and the second outer membrane 170 attract each others. The first outer membrane 130 bears more electrostatic force to the substrate 111 and it moves to the substrate 111. The second outer membrane 170 also moves to the substrate 111 due to the force between membrane 130 and 170. Since the middle membrane 150 does not move, the first cavity 141 becomes thicker and the second cavity 161 becomes thinner. The original thickness of the first cavity 141 and second cavity 161 can be half of the wavelength. When no voltage applied, the light incident will fully passed the device 110. When voltage applied and the first cavity 141 become three quarter of wavelength and second cavity 161 decreases to one quarter of wavelength, the light incident will be fully reflected. Also the original thicknesses of the first cavity 141 and second cavity 161 can be one of the following sets of values, respectively: three quarter wavelength and three quarter wavelength, one quarter wavelength and three quarter wavelength, half wavelength and one wavelength.

In the case that the middle membrane 150 is doped, one adjustable voltage is applied between the substrate 111 and the first outer membrane 130 and another adjustable voltage is applied between the middle membrane 150 and the second outer membrane 170. When these voltages increase, the first outer membrane 130 is attracted to the substrate 111 and the first cavity 141 becomes thicker. At meantime the middle membrane 150 and the second outer membrane 170 attract each others, and the second cavity 161 becomes thinner. The first outer membrane 130 and the middle membrane 150 are connected to common electrode (ground) so the first and second cavity can be tuned independently. The original thickness of the first cavity 141 and second cavity 161 can be one of the following sets of values, respectively: half wavelength and one wavelength, three quarter wavelength and three quarter wavelength, one quarter wavelength and three quarter wavelength, half wavelength and half wavelength.

Figure 5:
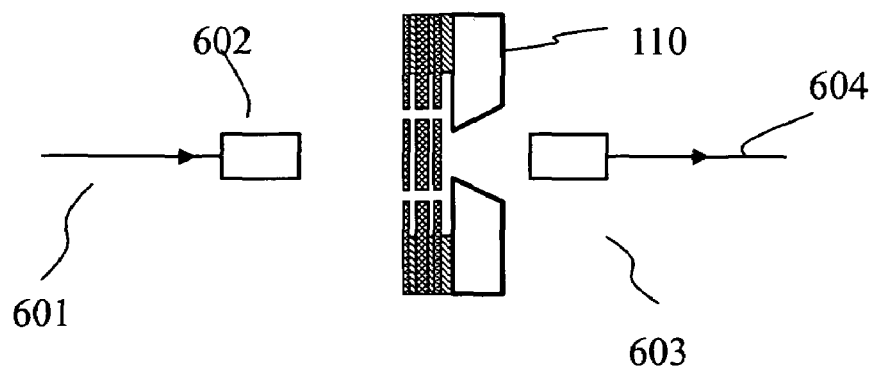
FIG. 5 shows a schematic configuration of VOA containing the device having one substrate.

FIG. 5 shows a scheme of VOA adopting the device 110. Light from a fiber 601 is focused by a lens 602 and shine on the device 110. On the other side, a lens 603 collects the passing through light to a fiber 604

Figure 6:
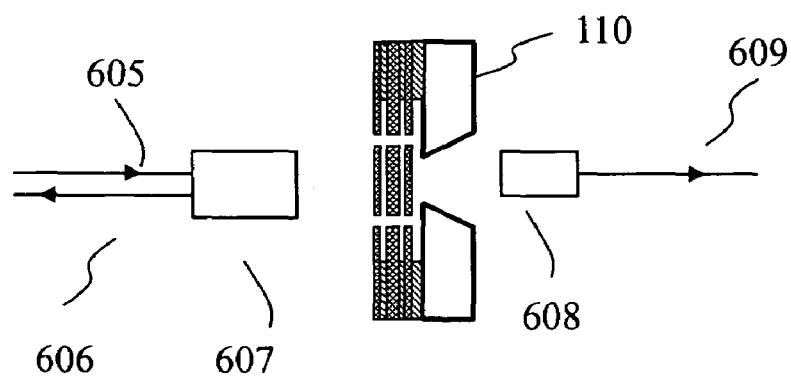
FIG. 6 shows a schematic configuration of switches containing the device having one substrate.

FIG. 6 shows a scheme of switches adopting the device 110. Light from a fiber 605 is focused by a lens 607, on certain conditions, light can be fully pass through the device 110. A lens 608 collects the light, and a fiber 609 output the light. If the first and second cavities are changed, light can be fully reflected back. The lens 607 will collect the reflected light and a fiber 606 will output the light.

Figure 7:
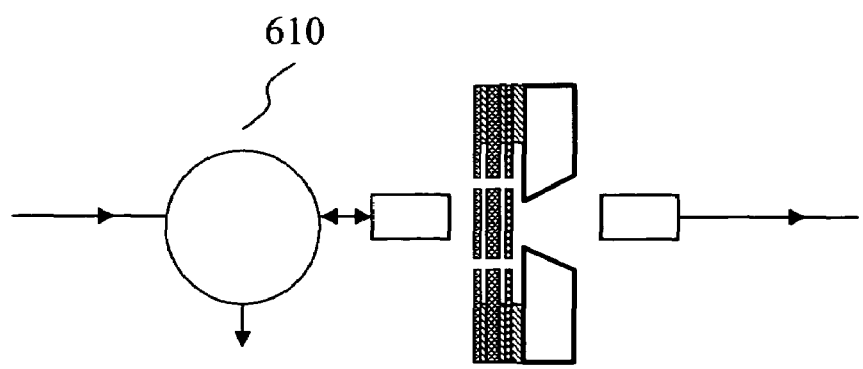
FIG. 7 shows an alternative schematic configuration of switches with a circulator.

FIG. 7 shows another scheme of switcher using a circulator 610.

Figure 10:
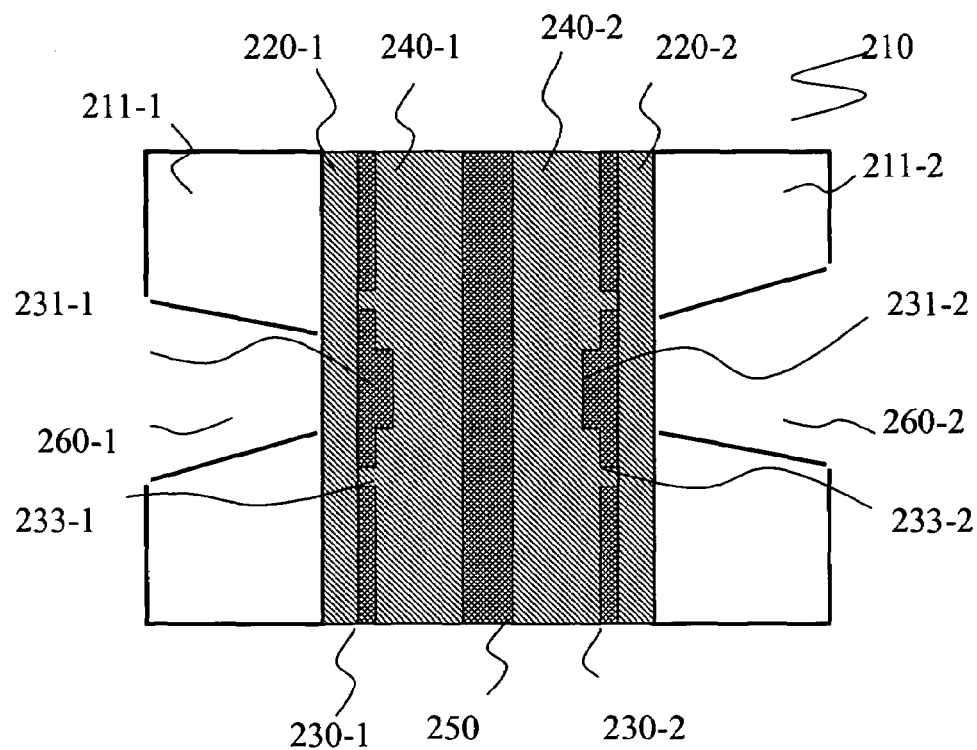
FIG. 10 illustrates the bonding or gluing of the two substrates face to face.
Figure 11:
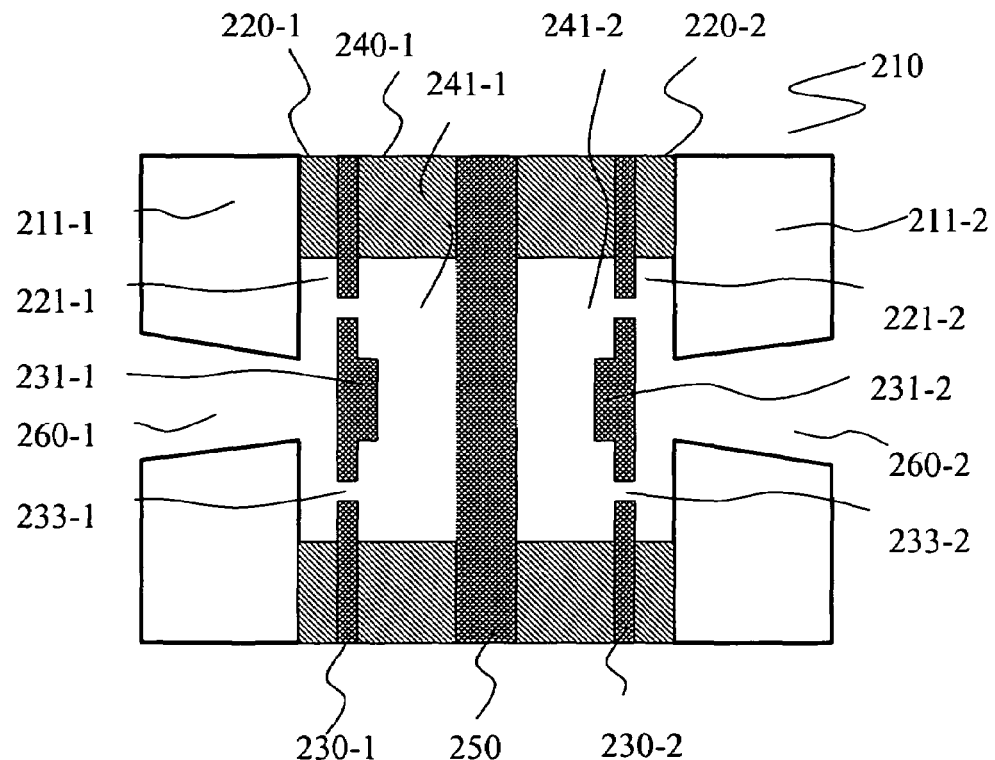
FIG. 11 illustrates the structure of a device having two substrates.

According to the present innovation, devices with two substrates can also be made. FIG. 11 shows the one embodiment for the device having two substrates, and FIG. 8 to FIG. 10 show the process to make such devices.

Figure 8:
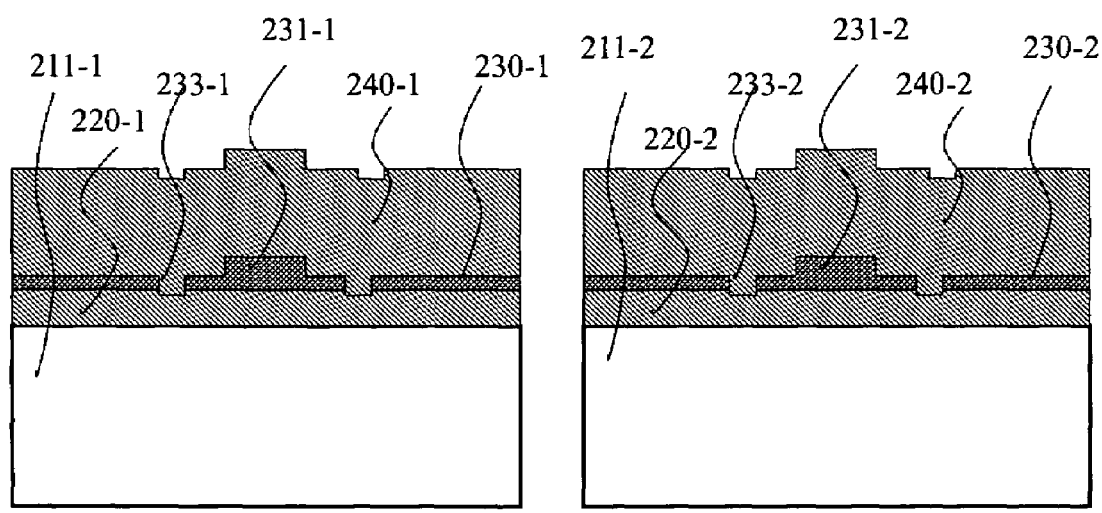
FIG. 8 illustrates the sequence of deposition on two substrates, and the outer membranes have detailed structures.

In FIG. 8, layers of silicon dioxide 220-1 and 220-2 are deposited on the first substrate 211-1 and the second substrate 211-2, respectively. Then the first outer membrane 230-1 and the second outer membrane 230-2 are deposited on the dioxide layer 220-1 and 220-2, respectively. The first outer membrane 230-1 and the second outer membrane 230-2 are multi-layer dielectric membranes, having the same structure as the first outer membrane 130 in FIG. 1. And the numbers of the total deposited layers of the first outer membrane 230-1 and second outer membrane 230-2 are N4 and N5, respectively. The most part of the membranes 230-1 and 230-2 are thinned by etching, leaving the hat-top structure 231-1 and 231-2 on light path. This can be done by using photo resist as protecting mask. And the holes 233-1 and 233-2 can be made by dry etching around the hat-top structure 231-1 and 231-2, respectively. Then the silicon dioxide layer 240-1 and 240-2 are deposited over membranes 230-1 and 230-2, respectively. The dioxide layer 240-1 and 240-2 are not flat due to the holes and hat-top structures of the first outer membrane 230-1 and second outer membrane 230-2, and they are polished to have flat and smooth surfaces. After polishing, the thicknesses of dioxide layer 240-1 and 240-2 are the same, and in the range of 6 to 30 micrometer.

Figure 9:
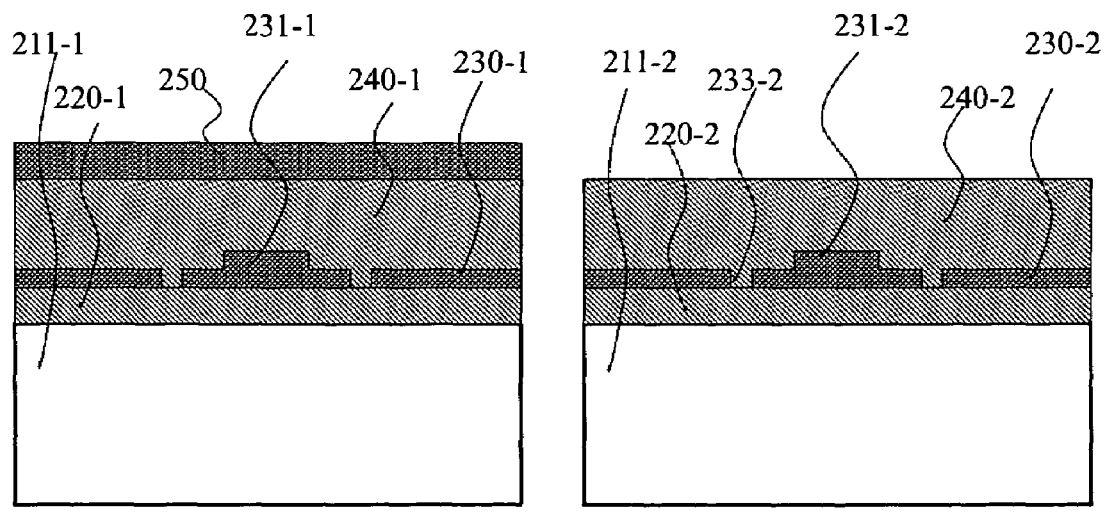
FIG. 9 illustrates the deposition of a middle membrane on a polished surface.

FIG. 9 shows the middle membrane 250 is deposited on the dioxide layer 240-1. The middle membrane 250 is a multi-layer dielectric membrane, and the deposition method and structure of the middle layer 250 is the same as the middle layers 150 in FIG. 1. An optional step here is that some holes around light path can be etched through the middle membrane 250.

Let N6 denote the number of the total layers of the middle membrane 250. N4, N5 and N6 satisfy the equation: N4+N5+5=N6.

FIG. 10 shows the first substrate 211-1 and second substrate 211-2 are bonded or glued face to face together, forming a device 210. And on light path the holes 260-1 and 260-2 are etched through on the first substrate 211-1 and the second substrate 211-2, respectively.

FIG. 11 illustrates the forming of the first non-optical cavity 221-1, the first cavity 241-1, the second cavity 241-2 and the second non-optical cavity 221-2 after the device 210 is etched by HF for certain time and fully cleaned and dried. Due to the gradient of tensile stress of the first outer membrane 230-1 and second outer membrane 230-2, structure 231-1 and 231-2 will have a curved surface after releasing. The curved surfaces benefit the optical property of tunable filters.

Figure 12:
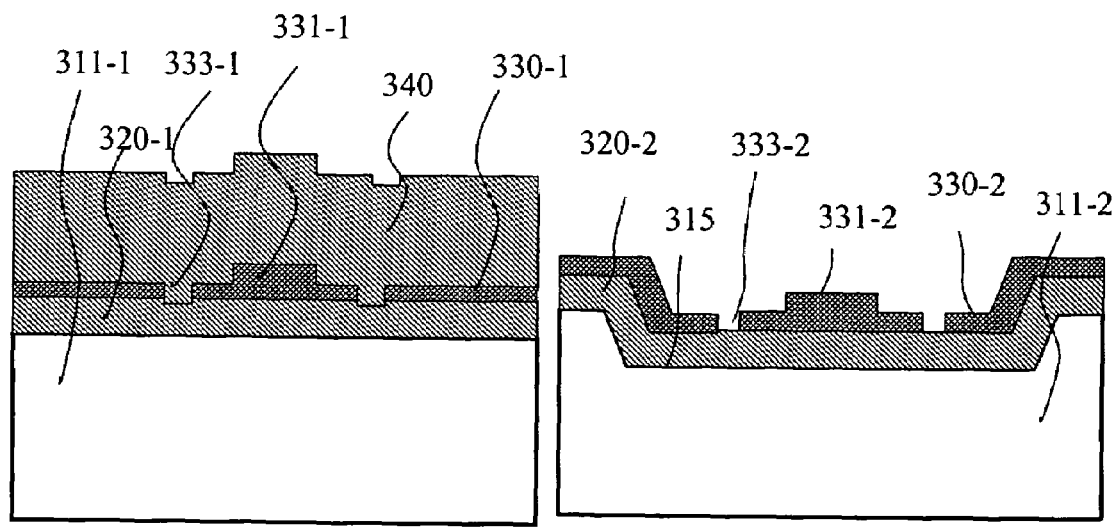
FIG. 12 illustrates a recess made on the surface of a second substrate before the deposition of membranes and dioxide layers.

FIG. 12 to FIG. 15 illustrate an alternative process and embodiment for the two-substrate devices. In FIG. 12, a recess 315 is made at the surface of the second substrate 311-2, and the depth of the recess 315 is in the range of 6 to 30 micrometer. Then on the first substrate 311-1 and second substrate 311-2, the silicon dioxide layers 320-1 and 320-2 with thickness of 2 to 5 micrometer are deposited, respectively. Over the dioxide layer 320-1 and 320-2, the first outer membrane 330-1 and second outer membranes 330-2 are deposited. The First outer membrane 330-1 and second outer membrane 330-2 have the same structure as the first outer membrane 230-1 in FIG. 8. The most part of the membranes 330-1 and 330-2 are thinned by etching, leaving a hat-top structure 331-1 and 331-2 on light path. This can be done by using photo resist as protect mask. And holes 333-1 and 333-2 around structure 331-1 and 331-2, are made through membrane 330-1 and 330-2 by dry etching.

Figure 13:
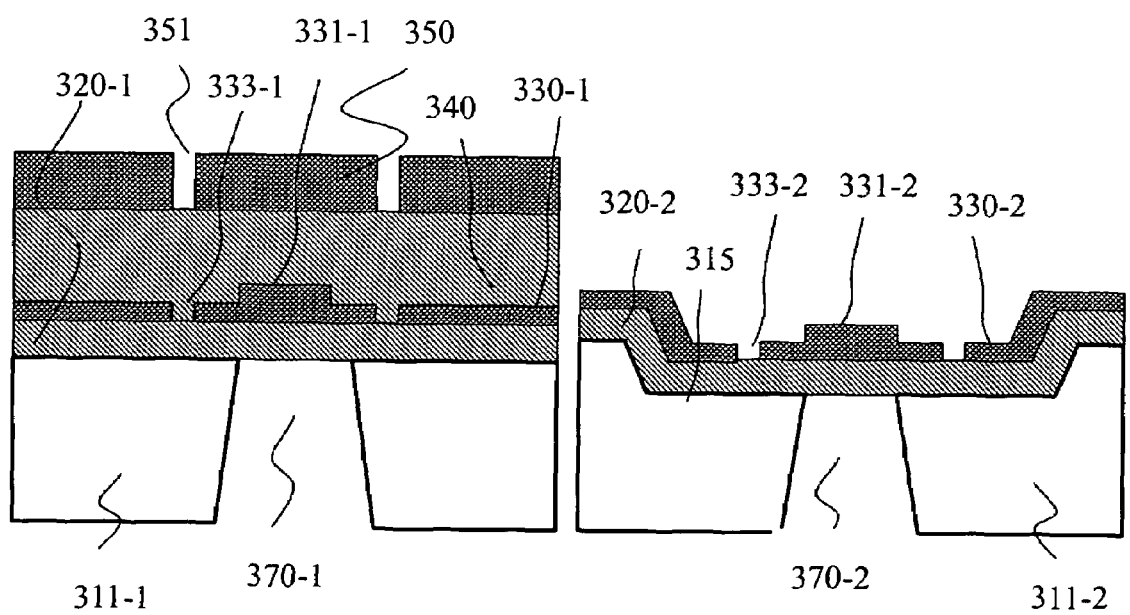
FIG. 13 illustrates a middle membrane is deposited after polish of dioxide layer only on the first substrate.

FIG. 13 shows only on the first membrane 330-1 a layer of silicon dioxide 340 is deposited. After polishing to make the surface flat, the thickness of the dioxide layer 340 is the same as the depth of the recess 315. Then the middle membrane 350 was deposited on the dioxide layer 340. The structure of the middle membrane 350 is the same as that of the middle membrane 250 in FIG. 9. On the middle membrane 350 holes 351 can be mad around light path optionally. Holes 370-1 and 370-2 are etched through substrate 311-1 and 311-2 on the light path, respectively.

Figure 14:
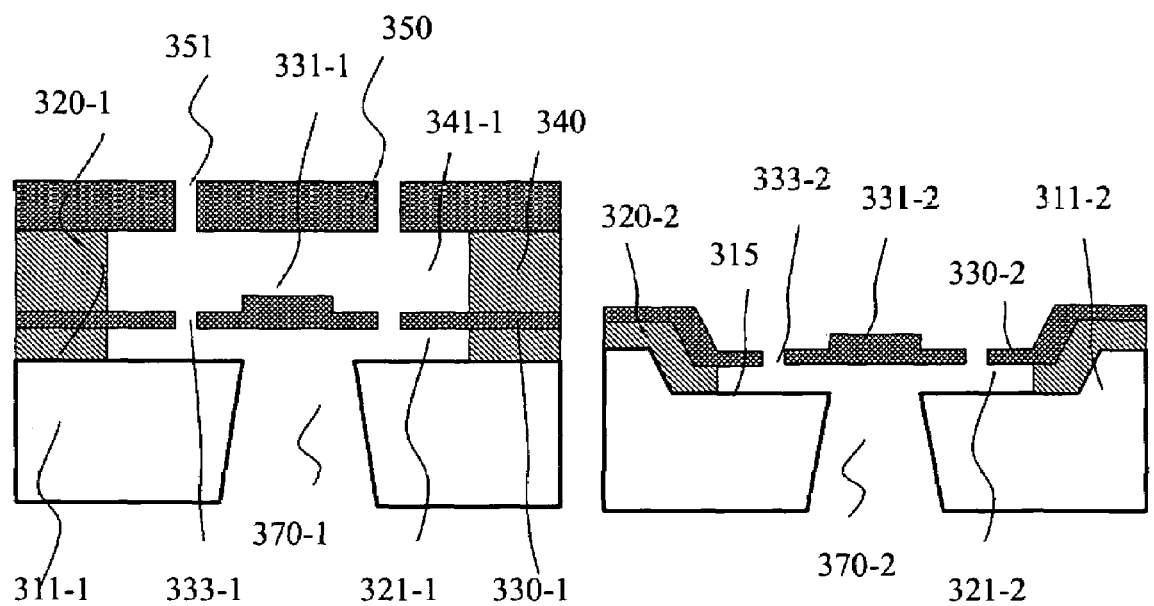
FIG. 14 illustrates some cavities forming on the two substrates by wet etching.

FIG. 14 illustrates the forming of first non-optical cavity 321-1 and first cavity 341-1 on the first substrate 311-1, the second non-optical cavity 321-2 on the second substrate 311-2, after etching by HF for certain time and fully cleaned and dried.

Figure 15:
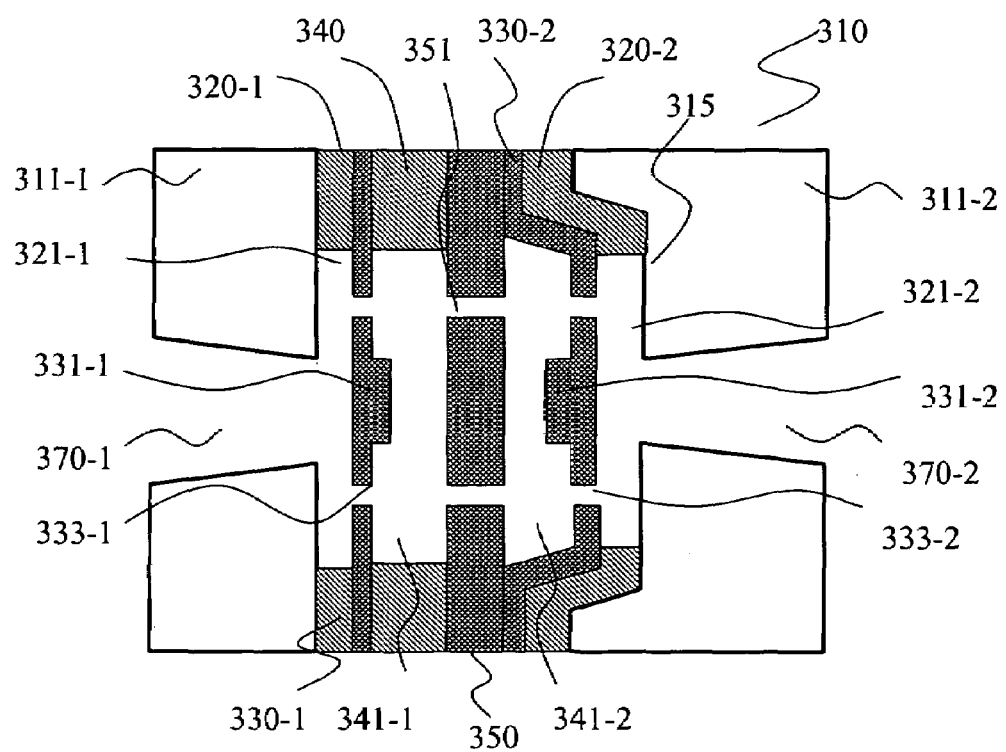
FIG. 15 illustrates an alternative embodiment of the device having two substrates.

FIG. 15 shows the substrate 311-1 and 311-2 are bonded or glued face to face, forming the device 310. At mean time, the second cavity 341-2 is formed due to the recess 315.

For the device 210, the first outer membrane 230-1 and the second outer membrane 230-2 can be doped on the first layer or the last layer of these membranes. The structure 231-1 and 231-2 may not be doped for the consideration of optical property of membranes. An adjustable voltage can be applied between the first substrate 211-1 and the first outer membrane 230-1, the same adjustable voltage or another adjustable voltage can be applied between the second substrate 211-2 and the second outer membrane 230-2. The membranes are attracted to the substrates and the first cavity and second cavity become thicker. When the two cavities vary at the same thicknesses, the devices can select different wavelength to pass through. The doping of layers and the voltage application are the same for the device 310 as those of device 210.

Figure 16:
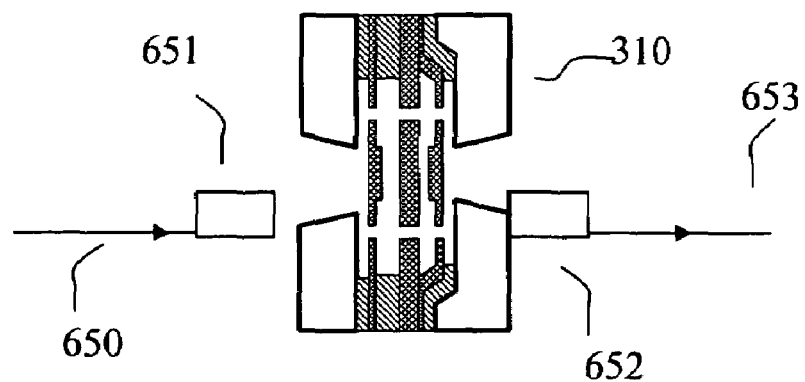
FIG. 16 shows a schematic configuration of tunable filters containing the device having two substrates.

FIG. 16 is a scheme of tunable filters adopting the device 210 or 310. Light from a fiber 650 is coupled by a lens 651 to the device 310. A lens 653 collects the passing through signal and couples it to a fiber 653.

Figure 17:
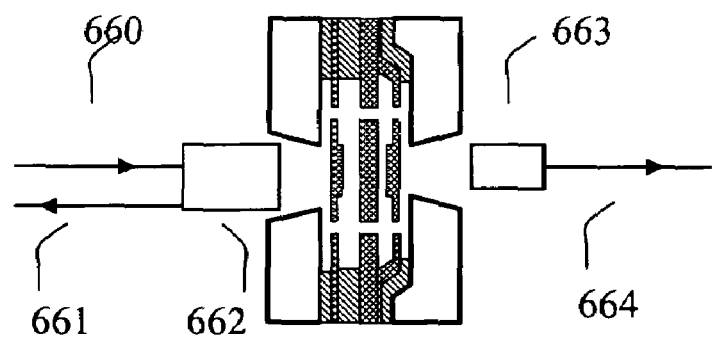
FIG. 17 shows a schematic configuration of add/drop complexers containing the device having two substrates.

FIG. 17 is the scheme of add/drop multiplexers adopting the device 210 or 310. For drop function, a two-fiber lens 662 coupled the light from a fiber 660 to the device 310 or 210, light selected by the device 210/310 is collected by a lens 663 and is outputted by a fiber 664. The rest light is reflected by the device and outputted by a fiber 661. For add function, light can be inputted from the fiber 664 and the 661, and is outputted from a fiber 660.

Figure 18:
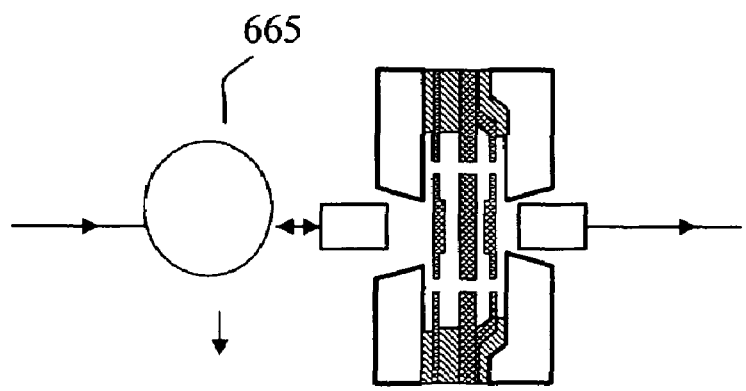
FIG. 18 shows a alternative schematic configuration of add/drop multiplexers.

FIG. 18 shows another scheme of add/drop multiplexers using a circulator 665.

I claim:

1. A tunable optical device comprising:
    a electrically conductive substrate;
    a first electrostatically deflectable outer membrane consisting of alternate layers of high refractive index material and low refractive index material, separated from said substrate by a non-optical cavity;
    a middle electrostatically deflectable membrane consisting of alternate layers of high refractive index material and low refractive index material, separated from said first outer membrane by a first optical cavity;
    a second eletrostatically deflectable outer membrane consisting of alternate layers of high refractive index material and low refractive index material, separated from said middle membrane by a second optical cavity;
    wherein said non-optical cavity is defined by a sacrificed layer between said substrate and said first outer membrane, said first optical cavity is defined by a sacrificed layer between said first outer membrane and said middle membrane, said second optical cavity is defined by a sacrificed layer between said middle membrane and said second outer membrane.

2. A tunable optical device claimed as claim 1, wherein the topmost and the bottommost layers of said first outer membrane, middle membrane and second outer membrane are materials of high refractive index wherein said material of high refractive index is polysilicon or amorphous silicon, said material of low refractive index is nitride, and the sum of the number of the layers of said first outer membrane and the number of the layers of said second outer membrane plus 5 equals the number of the layers of said middle membrane.

3. A tunable optical device claimed as claim 2, wherein the original thicknesses of said first optical cavity and of said second optical cavity are one of the following sets of values, respectively: three quarter wavelength and three quarter wavelength, half wavelength and one wavelength, one wavelength and one wavelength, half wavelength and half wavelength, one quarter wavelength and three quarter wavelength; wherein on said membranes there are some holes around light path.

4. A tunable optical device comprising:
    a first and a second electrically conductive substrate;
    a first electrostatically deflectable outer membrane consisting of alternate layers of high refractive index material and low refractive index material, separated from said first substrate by a first non-optical cavity;
    a middle deflectable membrane consisting of alternate layers of high refractive index material and low refractive index material, separated from said first outer membrane by a first optical cavity;
    a second eletrostatically deflectable outer membrane consisting of alternate layers of high refractive index material and low refractive index material, separated from said second substrate by a second non-optical cavity;

a second optical cavity formed by said middle membrane and second outer membrane when said first substrate and said second substrate bonded or glued together;

wherein said first non-optical cavity is defined by a sacrificed layer between said first substrate and said first outer membrane, said first optical cavity is defined by a sacrificed layer between said first outer membrane and said middle membrane, said second non-optical cavity is defined by a sacrificed layer between second substrate and said second outer membrane.

5. A tunable optical device claimed as claim 4, wherein the topmost and the bottommost layers of said first outer membrane, middle membrane and second outer membrane are materials of high refractive index wherein said material of high refractive index is polysilicon or amorphous silicon, said material of low refractive index is nitride, and the sum of the number of the layers of said first outer membrane and the number of the layers of said second outer membrane plus 5 equals the number of the layers of said middle membrane.

6. A tunable optical device claimed as claim 5, wherein the spacer of said second cavity is a layer of silicon dioxide deposited on either said second outer membrane or on said middle membrane and is partly etched off.

7. A tunable optical device claimed as claim 5, wherein said second cavity is formed due to a flat-bottom recess on said second substrate.

8. A tunable optical device claimed as claim 6 and claim 7, wherein said first outer membrane and said second outer membrane have hat-top structures.

* * * * *